United States Patent
Thompson et al.

(10) Patent No.: US 8,402,514 B1
(45) Date of Patent: Mar. 19, 2013

(54) HIERARCHY-AWARE ROLE-BASED ACCESS CONTROL

(75) Inventors: Timothy J. Thompson, San Jose, CA (US); James Hartwell Holl, II, Los Gatos, CA (US); William Raoul Durant, Alamo, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 1301 days.

(21) Appl. No.: 11/601,100

(22) Filed: Nov. 17, 2006

(51) Int. Cl.
*H04L 29/00* (2006.01)
(52) U.S. Cl. ......................................................... 726/4
(58) Field of Classification Search .................. None
See application file for complete search history.

(56) References Cited

U.S. PATENT DOCUMENTS

| | | | |
|---|---|---|---|
| 5,761,669 A | 6/1998 | Montague et al. | |
| 5,911,143 A | 6/1999 | Deinhart et al. | |
| 6,023,765 A | 2/2000 | Kuhn | |
| 6,088,679 A | 7/2000 | Barkley | |
| 6,457,130 B2 | 9/2002 | Hitz et al. | |
| 6,757,901 B1 | 6/2004 | McCloghrie et al. | |
| 6,985,955 B2 | 1/2006 | Gullotta et al. | |
| 7,096,222 B2 | 8/2006 | Kern et al. | |
| 7,185,192 B1 | 2/2007 | Kahn | |
| 7,340,469 B1 | 3/2008 | Alghathbar et al. | |
| 7,404,203 B2 | 7/2008 | Ng | |
| 7,424,533 B1 | 9/2008 | Di Benedetto et al. | |
| 7,546,297 B2 | 6/2009 | Moulhaud et al. | |
| 7,673,323 B1 * | 3/2010 | Moriconi | 726/1 |
| 7,730,523 B1 | 6/2010 | Masurkar | |
| 7,774,827 B2 | 8/2010 | Kinser et al. | |
| 7,788,700 B1 | 8/2010 | Feezel et al. | |
| 2001/0047485 A1 | 11/2001 | Brown et al. | |
| 2004/0162905 A1 * | 8/2004 | Griffin et al. | 709/229 |
| 2004/0199765 A1 | 10/2004 | Kohane et al. | |
| 2005/0021977 A1 | 1/2005 | Oberst | |
| 2005/0114661 A1 | 5/2005 | Cheng et al. | |
| 2005/0154888 A1 | 7/2005 | Chen et al. | |

(Continued)

FOREIGN PATENT DOCUMENTS

| | | |
|---|---|---|
| DE | 19954358 A1 | 7/2000 |
| EP | 1 124 172 | 8/2001 |

(Continued)

OTHER PUBLICATIONS

Buehler et al., Performance tuning of Portal Access Control, IBM, Aug. 2005, Retrieved from the Internet on Apr. 25, 2010: <URL: http://www.ibm.com/developerworks/websphere/library/techarticles/0508_buehler/0508_buehler.html>.*

(Continued)

*Primary Examiner* — Minh Dinh
(74) *Attorney, Agent, or Firm* — Blakely, Sokoloff, Taylor & Zafman LLP

(57) ABSTRACT

A method, apparatus, and system are described herein, in which system resources and operations are assigned to roles in a role-based access control system, and the roles are assigned to a plurality of users. An RBAC system is used to resolve the client request to perform an operation on a resource, the RBAC system using a hierarchy of the plurality of resources to determine if a user is permitted to perform the operation on a parent of the resource in the hierarchy of resources. The RBAC system also determines if a user is permitted to perform the operation on the resource if a user group to which the user belongs to has the required access.

16 Claims, 11 Drawing Sheets

U.S. PATENT DOCUMENTS

| | | | |
|---|---|---|---|
| 2005/0193196 | A1 | 9/2005 | Huang et al. |
| 2005/0229236 | A1 | 10/2005 | Devgan et al. |
| 2006/0010483 | A1 | 1/2006 | Buehler et al. |
| 2006/0235985 | A1 | 10/2006 | Ramkumar et al. |
| 2006/0259954 | A1* | 11/2006 | Patrick .............................. 726/2 |
| 2007/0061872 | A1 | 3/2007 | Carter |
| 2007/0276951 | A1 | 11/2007 | Riggs et al. |
| 2007/0283443 | A1 | 12/2007 | McPherson et al. |
| 2008/0016580 | A1 | 1/2008 | Dixit et al. |

FOREIGN PATENT DOCUMENTS

| | | |
|---|---|---|
| WO | WO 02/50691 | 6/2002 |
| WO | WO 02/073436 | 9/2002 |

OTHER PUBLICATIONS

WebSphere Portal for z/OS Version 5.1.x—Security Guide, IBM, 2005, pp. 69-97, Retrieved from the Internet on Apr. 25, 2010: <URL: http://publib.boulder.ibm.com/infocenter/wpdoc/v510/topic/com.ibm.wp.zos.doc/wp_sec_pdf.pdf>.*

Sun StorEdge NAS Solutions: The business case for network-attached storage (NAS), Sun Microsystems, Mar. 2006.

"An Introduction to Role-Based Access Control," NIST/ITL Bulletin, Dec. 1995, downloaded from http://csrc.nist.gov/groups/SNS/rbac/documents/design_implementation/Intro_role_based_access.htm, Mar. 1, 2010.

WebSphere Portal for z/OS Version 5.1.x—Security Guide, IBM, 2005, pp. 69-97, Retrieved from the Internet on Apr. 25, 2010: <URL: http://www.publib.boulder.ibm.com/infocenter/wpdoc/v510/topic/com.ibm.wp.zos.doc/wp_sec_pdf.pdf>.

"Cisco MDS 900 Family SAN OS 2.0(X)," Cisco Systems Inc., Data Sheet, 2004.

Neelakant, Ravindra, "Advances in SAN Intelligence," THIC Meeting, San Jose, CA, Mar. 2006.

Barkley, John, "Comparing Simple Role Based Acess Control Models and Access Control Lists," ACM Workshop on Role Based Access Control, Fairfax, Virginia, Aug. 1997.

"GalaxyNAS LX: Galaxy LX Series Network Attached Storage System Configuration and System Integration Guide," Rorke Data Inc., Mar. 2006.

Ahn et al., "Role-Based Authorization Constraints Specification Using Object Constraint Language," 2001, IEEE, pp. 157-162.

Clarke et al., "On the Use of Regular Expressions for Searching Text," ACM Transactions on Programming Languages and Systems, vol. 19, No. 3, May 1997, pp. 413-426.

Belokosztolski et al., "Meta-Policies for Distributed Role-Based Access Control Systems," Proceedings of the Third International Workshop on Policies for Distributed Systems and Networks (Policy '02), 2002, 10 pages.

Ferraiolo et al., "Role-Based Access Control," Proceedings of the 15th National Computer Security Conference, 1992, 11 pages.

Ravi Sandhu, "Transaction Control Expressions for Separation of Duties," 1988, IEEE, pp. 282-286.

Shih-Chien Chou, "Embedding role-based access control model in object-oriented systems to protect privacy," Journal of Systems and Software, vol. 71, 2004, 143-161.

Sandhu, Ravi, "Separation of Duties in Computerized Information Systems", *Proc. of the IFIP WG11.3 Workshop in Database Security*, Halifax, U.K., Sep. 18-21, 1990, pp. 1-10.

Crampton, Jason, "Constraints in Role-Based Access Control", 8th ACM Symposium on Access Control Models and Technologies, (Jun. 2003), 14 pages.

Han, Yan, et al., "Constraint Specification for Object Model of Access Control based on Role", ACM SIGSOFT Software Engineering Notes vol. 25, No. 2, (Mar. 2000), pp. 60-64.

Network Appliance, Inc., Non-Final Office Action mailed Oct. 6, 2011 for U.S. Appl. No. 11/601,099, filed Nov. 17, 2006, 8 pages.

* cited by examiner

200

Senior Administrator

| User | Operations |
|------|------------|
| A | Read, Write, Backup |
| B | Read, Write, Backup |
| C | Read, Write, Backup |
| • | • |
| • | • |
| • | • |
| X | Read, Write, Backup |

Junior Administrator

| User | Operations |
|------|------------|
| AA | Read, Write |
| BB | Read, Write |
| CC | Read, Write |
| • | • |
| • | • |
| • | • |
| XX | Read, Write |

| Role | Operation | Resource |
|------|-----------|----------|
| A | Read | Aggregate 1 |
| A | Write | Aggregate 1 |
| A | Backup | Aggregate 2 |
| B | Read | All Objects in Volume 3 |
| B | Write | Aggregate 1 |
| B | Write | Aggregate 2 |

⋮ ⋮

| | | |
|------|------|------|
| X | Read | Agregate 1 |

FIG. 3A

HIERARCHY-AWARE ROLE-BASED ACCESS CONTROL

FIELD OF THE INVENTION

Embodiments of the invention generally relate to storage systems. More particularly, an aspect of an embodiment of the invention relates to hierarchy aware role-based access control for storage systems.

BACKGROUND OF THE INVENTION

A common use of communication networks is to provide users access to network resources such as software, electronic data, or files in storage systems or databases connected to the network. As the number of users on a given network increases, there is often a need to control user access rights to resources on the network.

Network environments often involve a variety of network users, where the users may be grouped or categorized by a relation or role that the user serves in the environment. For example, in an engineering or technical development company environment, users of the company's computer network may include company officers, directors, managers, engineers, technical support staff, office support staff, accounting department staff, information technology (IT) department staff, contractors, consultants, temporary employees or other relation-based or role-based groups or categories of network users. Other companies, organizations or network environments may have other relation or role-based groups of users. Each user may have a need to access certain network resources in connection with the user's relation or role. In addition, it may be desirable to restrict users with certain relations or roles from access to certain resources, for example, for security, privacy or other reasons.

In many conventional businesses or organizations, specific personnel perform the function of managing users according to their roles. For example, an office administrator may place an order with the organization's IT department to have one or more resources available on the day a new user joins the organization. Individuals from the IT department would then manually set up these resources. Over the course of time, the user's relationship or roles within the organization may change, for example, as the user is transferred, promoted, demoted or terminated from the organization. As a user's relationship or role with the organization changes, the user's needs or rights to access resources may change.

The burden on the office administrator and office personnel to manually administer user access to resources in the above example is typically dependent on the size of the organization (the number of users) and the rate at which users join or leave the organization or otherwise change roles. To improve efficiency and reduce the burden on the office administrator and office personnel, some organizations have used software applications which automate or partially automate some of the tasks relating to managing certain, limited types of resources to users.

FIG. 1 illustrates a prior art method 100 of providing access control. At block 101, the prior art method 100 determines what operations a user is allowed to perform on one or more resources. At block 111, the prior art method 100 provides access control based on the operations the user can perform. Accordingly, if a user has been explicitly assigned a privilege to perform an operation on a resource, then the user can perform the operation. Thus, prior art method 100 uses a privilege-based access control system. Whenever a user or group of users is added to the system, an administrator must explicitly configure a set of privileges for each group of resources in the system. If a new resource is introduced, the administrator may need to modify the privileges of every user known to the system. As the number of users and resources grows, the usability of the system declines and security is reduced. Also, usability declines because users are not granted privileges that they need to complete their job functions because granular management is too expensive.

Because it is typically very inconvenient for a system administrator to provide each user with individual access rights and to achieve a higher grade of data security and integrity in a computer system, Role-Based Access Control (RBAC) methods have been developed. RBAC is one form of automatic access control management that has become commercially available. RBAC provides permissions (access rights) to a user to access certain accounts (files, web pages, etc.) available over the network, based on a person's role in the organization.

Therein, a role is mainly a definition of a job at the lowest level of granularity used in the enterprise or organization. In an RBAC system, the system administrator only has to grant or revoke access rights to a role and has to group different subjects under each role. Role-based access control (RBAC) is a system whereby access to resources is defined and controlled based on the role or job function of a user, rather than based on organizational group.

A prior art RBAC method includes associating operations to users. Accordingly, a role can perform one or more operations. For example, a role "Adminstrator" can perform backup of all files, while a role "CEO" can write to all files. Typically, a role is defined as a data structure that includes a two-column table with user ids in column and associated operations in the other column. For example, for the roles "Senior Administrator" and "Junior Administrator", an example two column table 200 is shown in FIG. 2A. Thus, users with the role "Senior Administrator" can perform read, write and backup operations on all resources in the system, while users with the role "Junior Administrator" can perform only read and write operations on all resources in the system. This prior art method provides very little granularity as the system does not differentiate between resources.

Also, modern organizations may be structured along several intersecting lines. For example, organizations may be structured according to title (presidents, vice-presidents, directors, managers, supervisors, etc.), technology (electronics, mechanical, software, etc.), project (product A, B, C, etc.), location (Irvine, N.Y., etc.) and the like. A single user may appear in several or all of these organizational structures, and thus may be in a somewhat unique overall role as compared to other users in the organization. Because this may require that many users be provisioned uniquely, many unique roles would have to be defined in the system to further such managing. Also, a large number of similar but not identical job positions in an organization require a large number of roles. This large number of roles causes a high storage requirement and high computing requirements for the security system within the computer system, leading to high costs for the operation of the security system. Furthermore, it is disadvantageous that the large number of roles makes it very difficult to manage the security system. The system administrator has to create a new role when a person remains in his job position but changes his location or project. Furthermore, a role includes the union of all operations and resources which users of that role have in different organization units of the enterprise. This means that the role will not necessarily contain the least permission necessary for the functions of that role.

An example of a computer system that requires that accesses to data by users are controlled is a business enterprise or other organization that manages large volumes of data and may operate multiple storage servers concurrently. These storage servers may be connected to each other through one or more networks. The storage servers and other network components may be managed by one or more network administrators (also called "administrative users" or simply "administrators"), who are responsible for configuring, managing and monitoring the storage servers, scheduling backups, troubleshooting problems with the storage servers, performing software upgrades, etc. These management tasks can be accomplished by the administrator using a separate management console on the network. The management console is a computer system that runs a storage management system application specifically designed to manage a distributed storage infrastructure. An example of such storage management software is DataFabric® Manager (DFM), which is made by Network Appliance, Inc. of Sunnyvale, Calif.

SUMMARY OF THE INVENTION

Embodiments of the invention include methods and related apparatus for resource level role based access control for storage management. In one embodiment, resource-identifying information is stored in a role-based access database for a network storage system, in association with role-identifying information for each of a plurality of roles and operation-identifying information. The operation-identifying information indicates one or more authorized operations for each of the plurality of roles and the resource-identifying information identifies specific resources maintained by the network storage system. The role-identifying information, data indicating one or more authorized operations for at least one of the roles, resource-specific identifying information and a hierarchy of resources maintained by the network storage system are used to determine whether to allow or deny a request from a network storage client to access a resource maintained by the network storage system.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 2 is an example of a table contained within a role in a prior art role based access control system;

FIG. 3A is an example of a table contained within a role in role based access control system;

DETAILED DESCRIPTION

Figure 1:
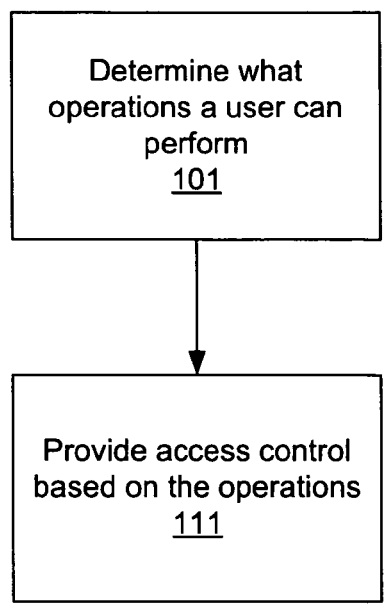
FIG. 1 is a flow diagram of a prior art method of providing access control.

In the following description, numerous specific details are set forth, such as examples of specific data signals, named components, connections, number of memory columns in a group of memory columns, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further specific numeric references such as first driver, may be made. However, the specific numeric reference should not be interpreted as a literal sequential order but rather interpreted that the first driver is different than a second driver. Thus, the specific details set forth are merely exemplary. The specific details may be varied from and still be contemplated to be within the spirit and scope of the present invention. The term coupled is defined as meaning connected either directly to the component or indirectly to the component through another component.

In general, the invention includes providing hierarchy aware resource level role based access control (RBAC) with a high level of granularity. The resource level RBAC system assigns access to resources to roles, and then assigns roles to users or user groups. In one embodiment, the "role" data structure includes a three-column table, having as the three columns user or user groups, operation, and resources. A knowledge of a hierarchy of resources is used to determine if a user has permission to perform an operation on a particular resource. Further, a knowledge of a hierarchy of users is used to determine if a user has permission to perform an operation on a particular resource.

Roles are a set of capabilities that may be assigned to the users or user groups. A capability is an ability to perform an operation on a resource. Accordingly, a capability is defined by a resource and an operation. An operation is an action that an application allows a user to do, and may include read, write, back up, restore, delete, etc. A resource is an object on which an operation may be applied. For example, an administrative user with the "Role Administrator" role may create new roles and assign capabilities to them, while an administrative user with the "Backup Administrator" role may only backup data.

According to an embodiment of the invention, in the context of storage systems, the hierarchy aware RBAC system allows administrators to refer to containers, such as filers, aggregates and volumes, in order to grant access to the objects the containers contain. For example, if a role provides access to a volume, then any attempt to access a LUN contained within the volume by the role may also succeed. As an example, a user can view details of a LUN if the hierarchy aware RBAC system determines that the user has a role containing a capability that grants the user the operation required for viewing the LUN details for any one of the (1) the volume the LUN is in, (2) the aggregate the volume is in, (3) the appliance the aggregate is in, or (4) the group the appliance is in.

Referring again to the three column table 250 shown in FIG. 3A, if an entry were to be created in the table 250 for each resource, the table could have a very large number of entries. Thus, to reduce the number of entries in the table 250, a hierarchy of resources is used. Accordingly, if an operation is permitted by a user on a resource, then a separate entry for a child of the resource is not required. For instance, if a user has permission to perform a first operation on an aggregate, then a separate entry for a volume of the aggregate is not required. Additionally, to reduce the number of entries in the table 250, a hierarchy of users can also be used. Accordingly, if an operation is permitted by a user group on a resource, then a separate entry for a member of the user group is not required. For instance, if a user group A has permission to perform a first operation on an aggregate, then a separate entry for user B of user group A to perform the first operation on the aggregate is not required.

A resource level RBAC system has a network server, which provides a user interface for configuring roles and assigning roles to users and user groups. Roles specify the operations that may be performed on a specific resource. By specifying which resources a user can perform specified operations on, resource level RBAC system can be used to provide a high degree of granularity. For instance, access control can be specified to all resources, down to each and every LUN. Besides providing greater granularity, resource-level RBAC also provides greater security. Resource-level RBAC allows administrators to configure more secure systems by more tightly limiting the access of users. Further, even if a user with a role leaves the organization, not much updating needs to be done because a replacement user can be assigned to that role. Also, administrators are able to more easily add and remove resources and users and manage roles from a central management point. For instance, if a role is granted access to a storage system, such as a filer, and a new volume is created in the storage system, then permission is automatically propagated to the volume.

Figure 3B:
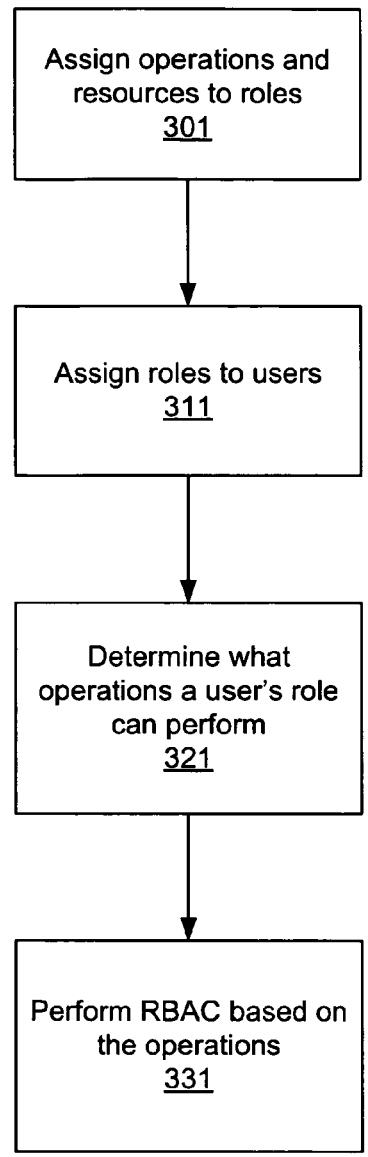
FIG. 3B illustrates a flow diagram of an embodiment of a method of providing hierarchy aware resource level access control.

FIG. 3B illustrates a method 300 of providing hierarchy aware resource level role-based access control according to an embodiment of the invention. Resource level role-based access control can be used to create permission to each and every system resource, such as every storage system. This provides a lot more granularity than previous methods.

At block 301, the method 300 assigns operations and system resources to roles. Roles typically acquire capabilities (the ability to perform an operation on a resource) when either an administrator manually assigns the capability to the role or an inherited role acquires the capability. At block 311, the roles are assigned to users. An administrator can assign a role to a user or a user group using a graphical user interface, a command line interface or a network application programming interface. If a role is assigned to a user group, users added to the user group are automatically assigned the role. Users are associated with a list of roles, including roles assigned to user groups they belong to. Whenever the capabilities of the user are calculated, the list of roles is used to make the determination. At block 321, upon receiving a request from a user to perform a particular operation on a resource, the method 300 uses a three-column table to determine what operations a user's role is allowed to perform on the resource. The table's first column entry may be a user, the second column entry is the operation(s) the role is allowed to perform, and the third entry is one or more resources on which that operation can be performed. For example, the table may include as (user, operation, resource) entries: (user 1, read, volume 1), (user 1 write, storage system 1), (user 1, backup, LUN1), (user 2 read, aggregate 1), and so on.

At block 331, the method 300 provides access control based on the operations the user's role can perform. As an example, say that user "userA" is in user group "Storage Management." The user group "Storage Management" has been assigned the "Software Developer" role. The "Software Developer" role inherits from the "Employee" role, which contains a capability consisting of the "Read" operation in the global scope (resource 0). Therefore, when userA tries to read (Read) the list of storage systems in say, NetApp Bangalore, he is granted access.

Thus, method 300 uses a resource level role-based access control system based on the operations the user is allowed to perform.

Figure 3C:
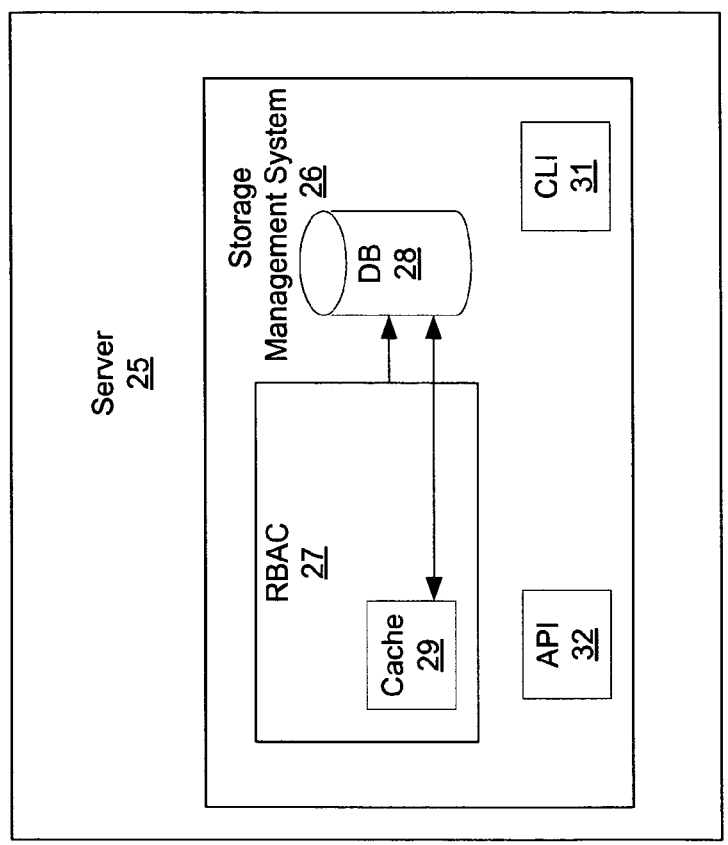
FIG. 3C illustrates an embodiment of a server that provides resource level access control.

FIG. 3C illustrates a block diagram of a server 25, which includes storage management software to perform the resource hierarchy-aware RBAC and other storage management related functions according to an embodiment of the invention. The storage management system 26 is integrated with the resource hierarchy-aware RBAC 27, and includes a database 28. Thus, the knowledge of the resource hierarchy is centralized in the embodiment shown in FIG. 3.

Database 28 may be used to store one or more data structures, such as tables. According to an embodiment of the invention, database 28 may include an objects table to store object types that are managed by the RBAC 27, a table to map users and user groups to roles, a table to define the access rights assigned to the roles, a table defining the available operations, a table to describe the hierarchical relationships between roles, a table listing the available roles, and a table to describe the hierarchical relationships between resources. In one embodiment, a knowledge of the resources is used to generate a hierarchy of resources by storage management system 26 and stored in the database 28. The information stored in the database 28 is used to determine whether a user has a particular type of access to a resource. Accordingly, a user may be granted access based on any of the roles the user has, or by any of the roles inherited by the roles that the user has, or because the user is a member of a user group with the necessary capabilities. Also, the user may be granted access because the user is granted access to perform a requested operation on a parent resource of the resource in question.

The resource hierarchy-aware RBAC 27 also includes a cache 29. The cache 29 is used to store results of queries made to database 28. Results of other database queries may be stored in the cache 29 since database queries are expensive. In one embodiment, when a user logs on, storage management system 26 authenticates the user and determines what roles the user has, and what capabilities the user has in each role. This information may then be cached in cache 29. The cache 29 may be invalidated upon detecting change in environment, e.g., change in the roles associated with a user.

Also included in storage management system 26 may be interfaces, such as command line interfaces (CLIs) 31, and Application Program Interfaces (APIs) 32. The APIs 32 may be used by external applications to make security checks against RBAC 27, and to manage their own RBAC information. In this way, even external applications can make avail of a single RBAC system as a uniform and consistent authorization mechanism.

Figure 4:
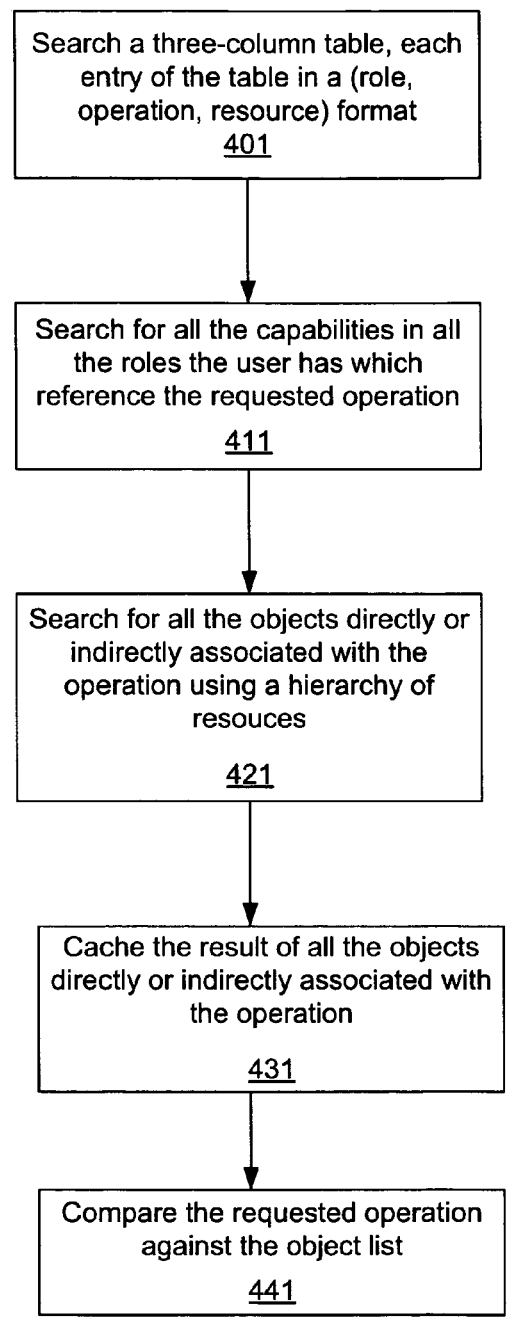
FIG. 4 illustrates a flow diagram of an embodiment of a method of providing role-based administrative access to a user using information about the hierarchy of resources.

FIG. 4 illustrates a flowchart of a method performed 400 according to an embodiment of the invention to provide role-based administrative access to a user for performing a particular operation (e.g., read, write, back up, delete, etc) on a particular resource (e.g. storage system, volume, aggregate, LUN, etc.) using information about the hierarchy of resources.

At block 401, the method 400 assigns operations and system resources to roles. The roles are assigned to users to create a three-column table that can be used to determine what operations a user's role is allowed to perform on the resource. The table may be stored in database 28; an example of a table 250 is shown in FIG. 3A. The table's first column entry is a role, the second column entry is the operation(s) the role is allowed to perform, and the third entry is one or more resources on which that operation can be performed. For example, the table may include as (role, operation, resource) entries: (role 1, read, volume 1), (role 1 write, storage system 1), (role 1, backup, LUN1), (role 2, read, aggregate 1), and so on.

At block 411, upon receiving a request from a user to perform a particular operation on a resource, the method 400 searches the table to look for one or more entries using the three parameters: user, operation, and the resource. If one or more entries are found, then the one or entries are checked to determine if the user is allowed to perform the requested operation on the resource. At block 421, the method 400 searches for all the objects directly or indirectly associated with the operation. Objects or resources associated directly with the operation may be listed in the entries of the table 250 as such. Thus, the table 250 includes resources on which a role has capability to perform the requested operation. The method 400 also uses a hierarchy of resources to determine other resources on which a role has capability to perform the requested operation.

At blocks 431, information about the result of all the objects directly or indirectly associated with the operation is saved in cache 29. Accordingly, if the next time, the user wishes to perform the same operation on the same resource, time and computing power is saved. The information about access permission can be readily obtained from the cache 29, without making too many database 28 queries. Queries are performed against the cache. If the cache for a user/operation pair does not exist or is out of date, then it is generated. At block 441, the requested operation is compared against the object list to determine if the user is allowed to perform the requested operation on the requested resource.

Thus, method 400 uses a hierarchy aware RBAC system to determine whether a user has access to perform an operation on a resource. Even if a resource is deleted or changed, not much updating of the access table is required. For instance, the table need not be updated to indicate that the user has access to perform a particular operation on a newly added volume, as long as the table has an entry to indicate that the user has access to perform the particular operation on the aggregate to which the volume belongs.

Figure 5:
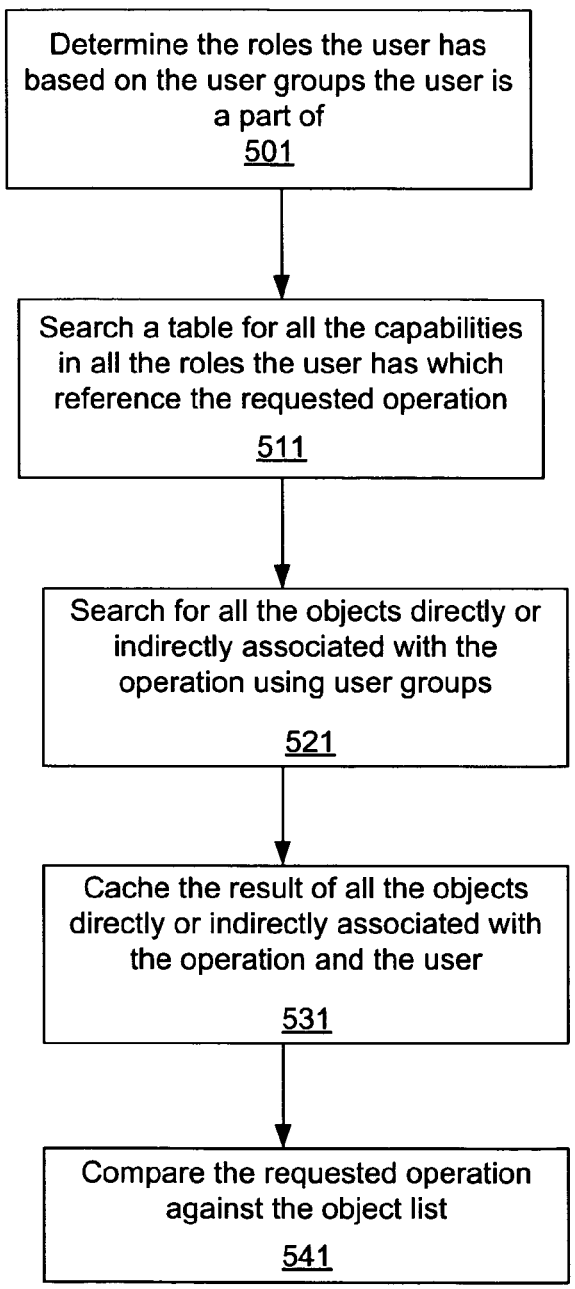
FIG. 5 illustrates a flow diagram of an embodiment of a method of providing hierarchy aware resource level access control.

FIG. 5 illustrates a flowchart of a method performed 500 according to an embodiment of the invention to provide role-based administrative access to a user for performing a particular operation (e.g., read, write, back up, delete, etc) on a particular resource (e.g. storage system, volume, aggregate, LUN, etc.) using information about the hierarchy of users.

At block 501, the method 500 assigns operations and system resources to roles. The roles are assigned to users to create a three-column table that can be used to determine what operations a user's role is allowed to perform on the resource. The table may be stored in database 28; an example of a table 250 is shown in FIG. 3A. A user may also be an individual user or a group of individual users (referred to as a "user group") or a group of user groups. The table's first column entry is role, the second column entry is the operation(s) the role is allowed to perform, and the third entry is one or more resources on which that operation can be performed. For example, the table may include as (role, operation, resource) entries: (role 1, read, volume 1), (role 1 write, storage system 1), (role 1, backup, LUN1), (role 2 read, aggregate 1), and so on.

At block 511, upon receiving a request from a user to perform a particular operation on a resource, the method 400 searches the table to look for one or more entries using the three parameters: user, operation, and the resource. If one or more entries are found, then the one or entries are checked to determine if the user is allowed to perform the requested operation on the resource.

At block 521, the method 500 searches for all the objects directly or indirectly associated with the operation. Objects or resources associated directly with the operation may be listed in the entries of the table 250 as such. Thus, the table 250 includes resources on which a role has capability to perform the requested operation. The method 400 also uses a hierarchy of resources to determine other resources on which a role has capability to perform the requested operation. In addition, a knowledge of the user groups is used to determine which user groups the user belongs to. The knowledge of a user's user group associations is then used to determine all the objects associated with the operation and the user group(s) and the children of those objects. A series of queries against a set of database tables which encode the parent/child relationships between objects in the hierarchy is made. The result of the queries is list of all objects that a user and the user's user groups are allowed to perform a given operation on. A knowledge of the user groups that the user belongs to may be stored in the database 28.

At block 531, information about the result of all the objects directly or indirectly associated with the user is saved in cache 29. Accordingly, if the next time, the user wishes to perform the same operation on the same resource, time and computing power is saved as the access permission can be readily obtained from the cache 29, without making too many database 28 queries. At block 541, the requested operation is compared against the object list to determine if the user is allowed to perform the requested operation on the requested resource.

Thus, method 500 uses a user hierarchy RBAC system that uses a hierarchy knowledge of user groups. Even if a user group is deleted or changed, not much updating of the access table is required. For instance, the table need not be updated to indicate that a new user has access to perform a particular operation on a resource, as long as the table has an entry to indicate that the user group to which the new user has been added has access to perform the particular operation on the resource.

Figure 6:
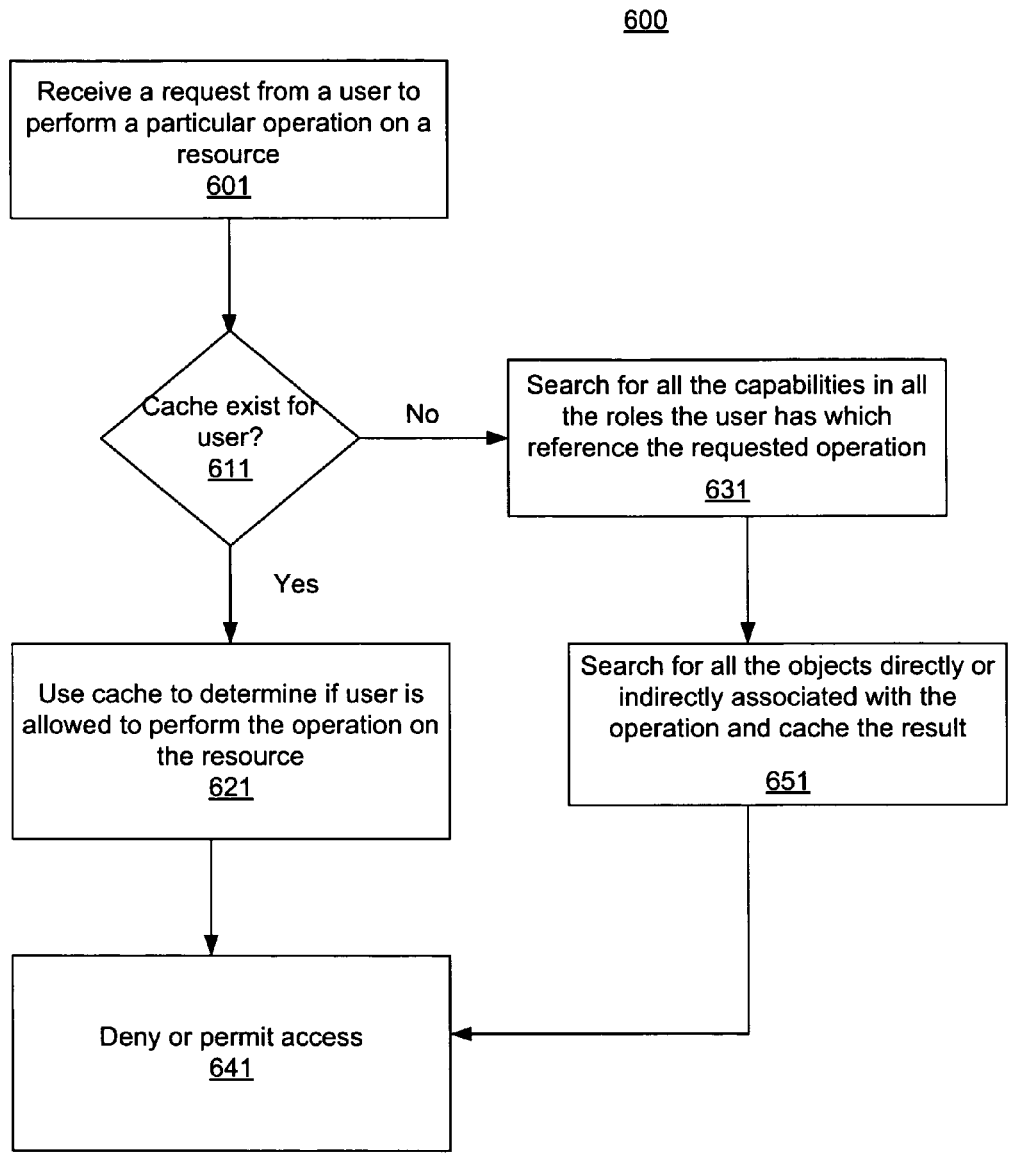
FIG. 6 illustrates a flow diagram of an embodiment of a method of providing hierarchy aware resource level access control.

FIG. 6 illustrates a method 600 of providing hierarchy-aware resource level role-based access control using cache 29 according to an embodiment of the invention. At block 601, the method 600 receives a request from a user to perform a particular operation on a resource. At block 611, the method 600 determines whether a cache exists for that user. At block 621, the cache is used to determine if the user is allowed to perform the requested operation on the resource. Based on the access check, then at block 641, permission is provided or denied to the user to access the resource. Otherwise, at block 631, a knowledge of the hierarchy of the resources (e.g., in accordance to method 400 shown in FIG. 4) and/or a knowledge of a hierarchy of users (e.g., in accordance to method 500 shown in FIG. 5) is used to determine if any one of the user's role is allowed to perform the requested operation on the resource. At bock 651, information about allowance or denial is cached. Based on the access check, then at block 641, permission is provided or denied to the user to access the resource. Thus, method 600 uses a resource hierarchy-aware role-based access control system.

Figure 7:
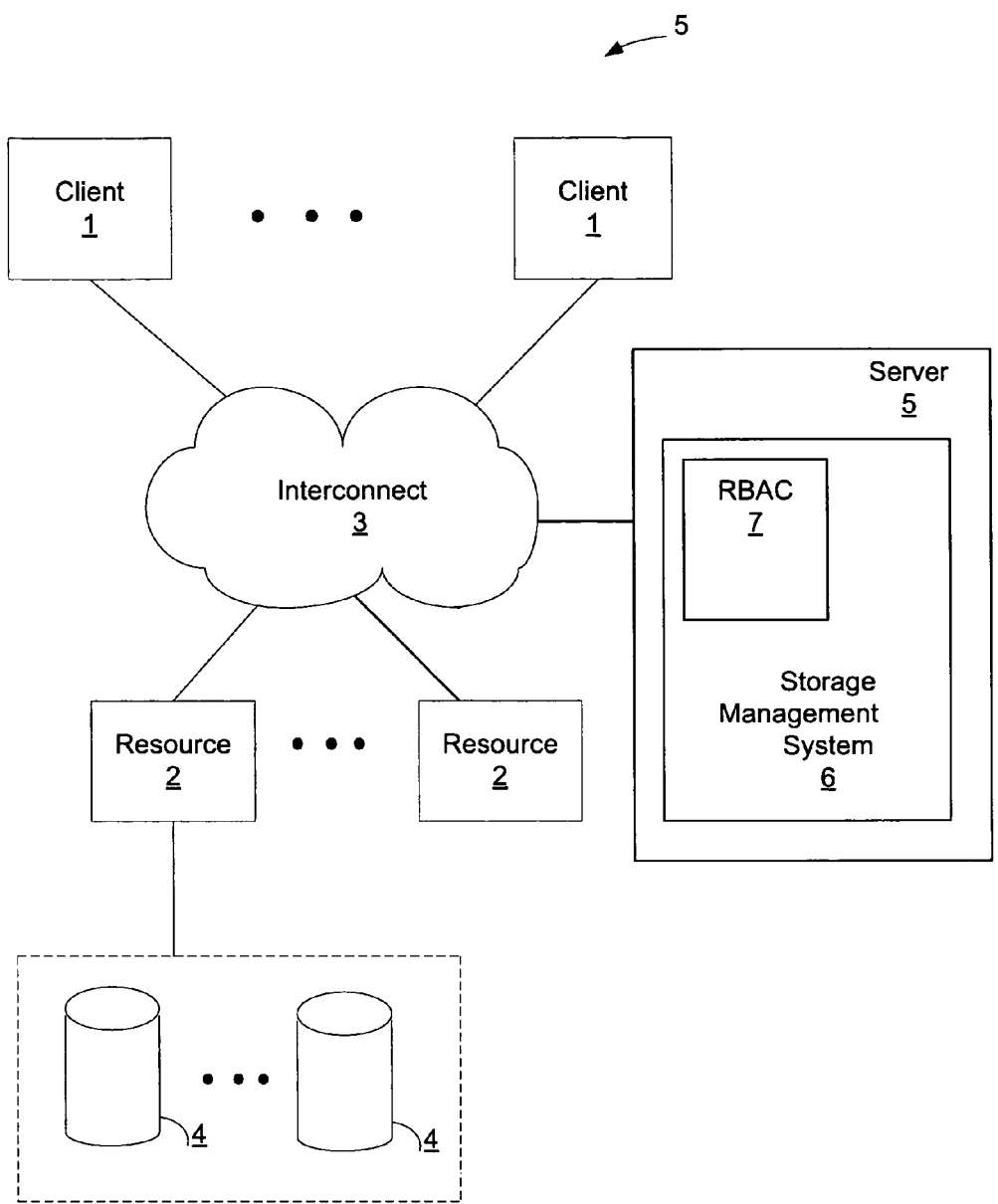
FIG. 7 illustrates a network environment in which the invention can be implemented.

FIG. 7 shows a network environment in which the invention can be implemented. In FIG. 7, a number of resources 2 are coupled through a network 3 to a number of clients 1. Multiple resources are coupled to the network 3, each configured to provide clients 1 with access to data stored in a set of mass storage devices, and a centralized network server 5 is used to provide centralized control of administrative access to the storage servers.

A resource 2, such as a storage server, may be coupled locally to a separate storage subsystem 4, which includes multiple mass storage devices. Each storage subsystem 4 is managed by its corresponding server 900. A server 5 receives and responds to various administrative requests (read, write, back up, delete, restore, etc.) from the clients 1, directed to a resource 2. The server 5 may be a storage management console which comprises storage management software, such as storage management system 6, to perform the resource hierarchy-aware RBAC and other storage management related functions. Integrated with storage management system 6 is the resource level RBAC 7. Storage management system 6 maintains a hierarchy of resources.

A resource 2 may include appliances, aggregates, volumes, LUNs, filers (file servers used in a NAS mode), virtual filers (virtual file servers), hosts, and so on. A volume is an independent file system with its own RAID groups. The network 3 may be, for example, a local area network (LAN), a wide area network (WAN), or other type of network or a combination of networks. The mass storage devices in storage subsystem 4 may be, for example, conventional magnetic disks, optical disks such as CD-ROM or DVD based storage, magneto-optical (MO) storage, or any other type of non-volatile storage devices suitable for storing large quantities of data. The storage devices in storage subsystem 4 can be organized as a Redundant Array of Inexpensive Disks (RAID), in which case the corresponding server 900 accesses the storage subsystem 4 using an appropriate RAID protocol.

The server-side implementation of the resource hierarchy-aware RBAC system 7, as illustrated in FIG. 7, reduces the need for a client 1 to make multiple client/server API calls, thus, improving the performance of functions requiring mass access checks (such as reporting). Also, different clients 1 do not have to implement and maintain multiple RBAC implementations because they share the server implementation. Further, server-side caching techniques (e.g., group caching) can be used to accelerate request handling at the server 5.

According to an embodiment of the invention, roles are used in a workflow system to determine who can request, approve and provision storage. Enterprises operate in terms of the roles assigned to their employees, but administrators have become accustomed to translating requirements into specific people or email aliases in order to satisfy workflow requirements. This process is typically time consuming for administrators and results in error as configurations get out of date. According to an embodiment of the invention, roles created as part of hierarchy aware RBAC are used for workflow routing. Combining RBAC with workflow adds additional levels of security by allowing enterprises to require multiple approvals for provisioning and allowing data administrators to perform their job functions.

An RBAC-aware workflow system, according to an embodiment of the invention, consists of a set of workflows defined by an administrator. A role can contain the capability to perform an action required by the workflow. As administrators change job functions, their roles are updated. This immediately changes their part in the workflow without requiring any manual changes to the workflow description. For example, if a user becomes a manager, they might be assigned a Manager role. When the system routes a request to a Manager, the user would be able to service the request. When the workflow system needs to determine whether or not a user or user group can fulfill a requirement of a workflow or find the list of users who could, the workflow system consults the RBAC system. Leveraging RBAC in this way allows administrators to reuse the security configuration they have already constructed. Further, an RBAC solution is dynamic and can be easily changed to reflect changing organization hierarchy and adapt to changing workflow requirements.

Figure 8:
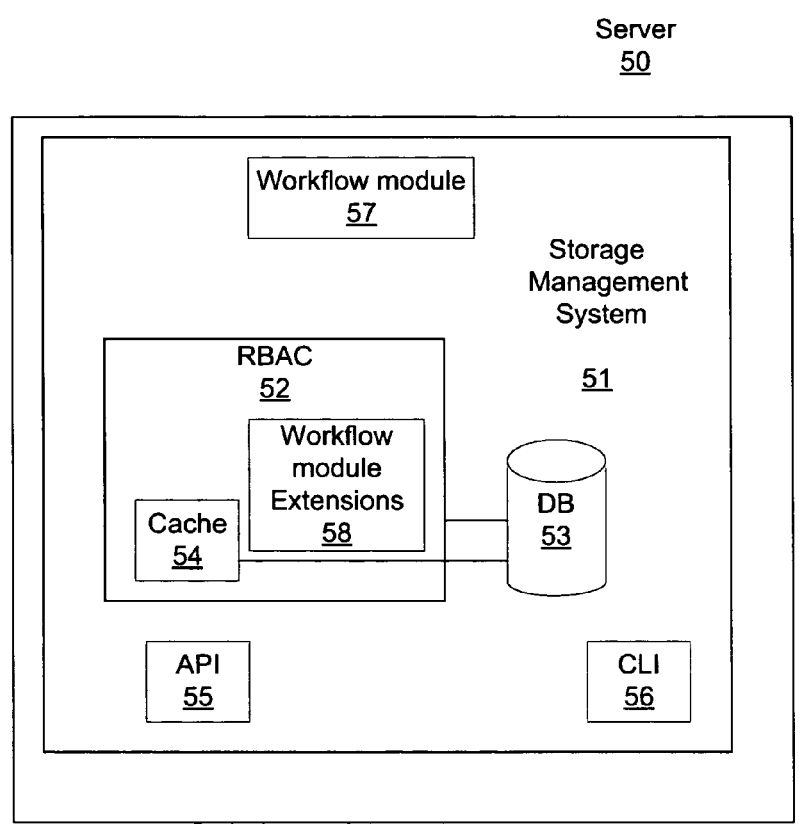
FIG. 8 illustrates an embodiment of a server that provides resource level access control.

FIG. 8 illustrates a block diagram of a server 50, which includes storage management software to perform the resource hierarchy-aware RBAC and other storage management related functions according to an embodiment of the invention. The server 50 is identical to the server 25 illustrated in FIG. 3, except that the RBAC module includes extensions 58 to support workflow module 57.

Figure 9:
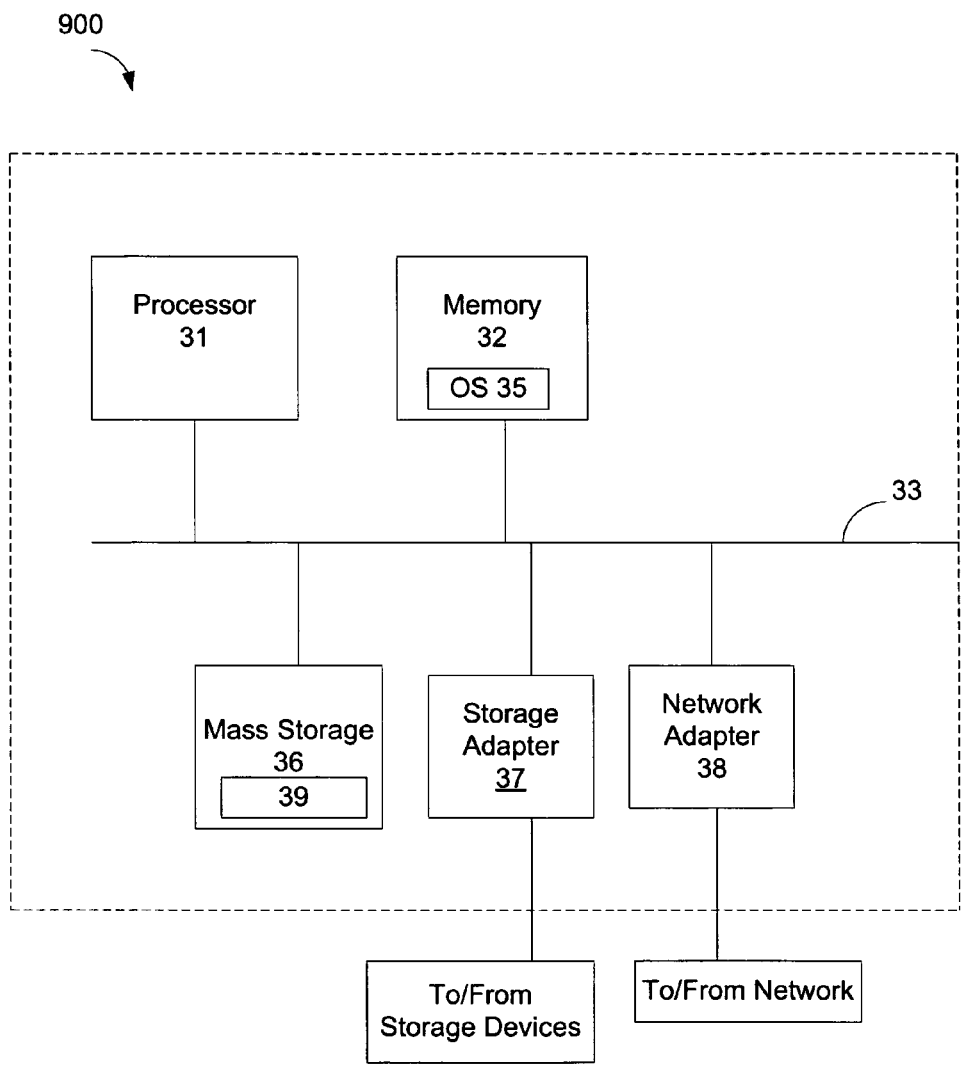
FIG. 9 is a high-level block diagram of a processing system.

FIG. 9 is a high-level block diagram of a server 900, which can be used to implement embodiments of the invention. Certain standard and well-known components which are not germane to the present invention are not shown. The storage server 900 in the illustrated embodiment includes a processor 31 coupled to a bus system 33. The bus system 33 is an abstraction that represents any one or more separate physical buses and/or point-to-point connections, connected by appropriate bridges, adapters and/or controllers. The bus system 33, therefore, may include, for example, a system bus, a Peripheral Component Interconnect (PCI) bus, a Hyper-Transport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor 31 is the central processing units (CPUs) of the server 900 and, thus, control the overall operation of the server 900. In certain embodiments, the physical processor 31 accomplishes this by executing software stored in memory 32. A physical processor 31 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The server 900 also includes memory 32 coupled to the bus system 43. The memory 32 represents any form of random access memory (RAM), read-only memory (ROM), flash memory, or a combination thereof. Memory 32 stores, among other things, the operating system 35 of the server 900, in which the techniques introduced here can be implemented.

Also connected to the processor 31 through the bus system 33 are a mass storage device 36, a storage adapter 37, and a network adapter 38. Mass storage device 36 may be or include any conventional medium for storing large quantities of data in a non-volatile manner, such as one or more disks. The storage adapter 37 allows the server 900 to access the external mass storage devices 4 and may be, for example, a Fibre Channel adapter or a SCSI adapter. The network adapter 38 provides the server 900 with the ability to communicate with remote devices such as the clients 1 over a network and may be, for example, an Ethernet adapter or a Fibre Channel adapter.

Memory 32 and mass storage device 36 store software instructions and/or data 35 and 39, which may include instructions and/or data used to implement the techniques introduced here. These instructions and/or data may be implemented as part of the operating system 35 of the server 900.

Thus, a method and apparatus for centralized providing hierarchy aware RBAC and RBAC-workflow solutions have been described. Note that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

In one embodiment, the software used to facilitate the algorithm can be embodied onto a machine-readable medium. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; Digital VideoDisc (DVD's), electrical, optical, acoustical or other form of propagated signals (e.g., carrier waves, infrared signals, digital signals, EPROMs, EEPROMs, FLASH memory, magnetic or optical cards, or any type of media suitable for storing electronic instructions. Slower mediums could be cached to a faster, more practical, medium.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
authenticating a user of a client when the user logs on to a storage management system;
upon successfully authenticating the user, determining a set of roles of the user and capabilities of the user in each of the determined roles, and caching the determined roles and capabilities of the user in a cache coupled to an access permission database;
receiving a request from the user to perform a first operation from a plurality of operations on a first resource from a plurality of storage system resources, wherein the storage system resources are organized as a hierarchy of containers and include at least a volume and an aggregate; and
performing an RBAC (Role-Based Access Control) access check to resolve the request using entries stored in the cache, wherein performing the RBAC access check further comprises:
identifying the entries in the cache having a role parameter matching one of the determined roles of the user and an operation parameter matching the first operation;
determining whether at least one of the identified entries has a resource parameter that matches the first resource or matches a parent resource of the first resource, wherein the parent resource is a container within which the first resource is located; and
upon determination that a match of the first resource or a match of the parent resource exists, granting access permission to the user of the client to perform the first operation on the first resource.

2. The method as recited in claim 1, further comprising:
storing a knowledge of the hierarchy of containers in a network server.

3. The method as recited in claim 2, wherein the knowledge of the hierarchy of containers is determined by a storage management system.

4. The method as recited in claim 1, further comprising:
determining whether a user group to which the user of the client belongs has permission to perform the first operation on the first resource.

5. The method as recited in claim 1, further comprising:
determining whether a user group to which the user of the client belongs has permission to perform the first operation on the parent of the first resource as defined by the hierarchy of containers.

6. The method as recited in claim 1, wherein the hierarchy of containers indicates that one or more containers are contained within another resource container.

7. The method as recited in claim 5, further comprising:
caching information about results of the determination of whether the user group to which the client belongs has permission to perform the first operation on at least one of the first resource or the parent of the first resource; and
using the cached information to resolve a third request from the client to perform the first operation on the first resource, wherein the third request is received subsequent to the first request.

8. The method recited in claim 4, wherein the determined capabilities of the user comprise a capability to perform an action required by a workflow.

9. A processing system comprising:
a processor;
a network interface through which to communicate with a plurality of storage devices resources over a network; and
a storage facility storing:
the plurality of storage device resources, which are organized as a hierarchy of containers and include at least a volume and an aggregate,
an access permission database,
a cache coupled to the access permission database, the cache being adapted to cache a set of roles of a user of a client and capabilities of the user in each of the roles when the user logs on to the processing system and is successfully authenticated; and
an RBAC (Role-Based Access Control) module, for execution by the processor, to:
identify entries from the cache in response to a request from the user, each of the identified entries having a role parameter matching one of the roles of the user, and each of the identified entries having an operation parameter matching a requested operation specified in the request,
determine whether a resource parameter of any of the identified entries matches a requested resource of the storage device resources or matches a parent resource of the requested resource, wherein the parent resource is a container within which the requested resource is located, and
upon determination that a match of the requested resource or a match of the parent resource exists, grant permission to the user to perform the requested operation on the requested resource.

10. The system of claim 9, wherein the access permission database is adapted to store hierarchy information for the storage device resources.

11. The system of claim 10, wherein the RBAC module is to query the cache to determine if one or more roles associated with the user of the client is permitted to perform the requested operation on the requested resource or the parent of the requested resource.

12. The system of claim 9, wherein the determined capabilities of the user comprise a capability to perform an action required by a workflow.

13. A method comprising:
authenticating a user of a client when the user logs on to a network server;
upon successfully authenticating the user, determining a set of roles of the user and capabilities of the user in each of the determined roles, and caching the determined roles and capabilities of the user in a cache coupled to an access permission database,
wherein the network server provides a role-based access control (RBAC) system adapted to assign storage system resources and operations to a plurality of roles, assign the plurality of roles to a plurality of users, and perform an RBAC access check to resolve a request from the user using entries stored in the cache,
wherein the storage system resources are organized as a hierarchy of containers and include at least a volume and an aggregate,
and
wherein performing the RBAC access check comprises:
identifying, from the cache, entries having a role parameter matching one of the determined roles of the user, and having a operation parameter matching a requested operation specified in the request;
determining whether a resource parameter of any of the identified entries matches a requested resource of the storage system resources or a parent resource of the requested resource, wherein the parent resource is a container within which the requested resource is located; and
upon determination that a match of the requested resource or a match of the parent resource exists, granting access permission to the user to perform the requested operation on the requested resource.

14. The method recited in claim 13, further comprising:
upon receiving the request from the user to perform the requested operation on the requested resource, determining a user group to which user belongs;
performing the RBAC access check by determining whether the user group can perform the requested operation on the requested resource; and
caching results of the RBAC access check on the network server.

15. The method as recited in claim 13, wherein the hierarchy of containers is determined by a storage management system and stored on the access permission database on the network server.

16. The method recited in claim 13, wherein the determined capabilities of the user comprises a capability to perform an action required by a workflow.

* * * * *